A. GIRARD.
PURIFYING DEVICE FOR NIGHT SOIL, WASTE WATERS, AND THE LIKE.
APPLICATION FILED AUG. 18, 1910.

1,060,178.

Patented Apr. 29, 1913.

Witnesses:
E. M. Moore.
L. E. Barkley.

Inventor
Alexandre Girard
by Fuchs Anneman
Attorney.

UNITED STATES PATENT OFFICE.

ALEXANDRE GIRARD, OF PARIS, FRANCE.

PURIFYING DEVICE FOR NIGHT-SOIL, WASTE WATERS, AND THE LIKE.

1,060,178.  Specification of Letters Patent.  Patented Apr. 29, 1913.

Application filed August 18, 1910. Serial No. 577,815.

*To all whom it may concern:*

Be it known that I, ALEXANDRE GIRARD, a citizen of the French Republic, and resident of Paris, France, have invented certain new and useful Improvements in Purifying Devices for Night-Soil, Waste Waters, and the Like, of which the following is a specification.

This invention relates to a purifying device allowing of the dissolution of night-soil, waste waters and any materials adapted to be solubilized by the anaerobic microbes, and thereafter the subsequent oxidation of the liquids thus obtained.

Figure 1:
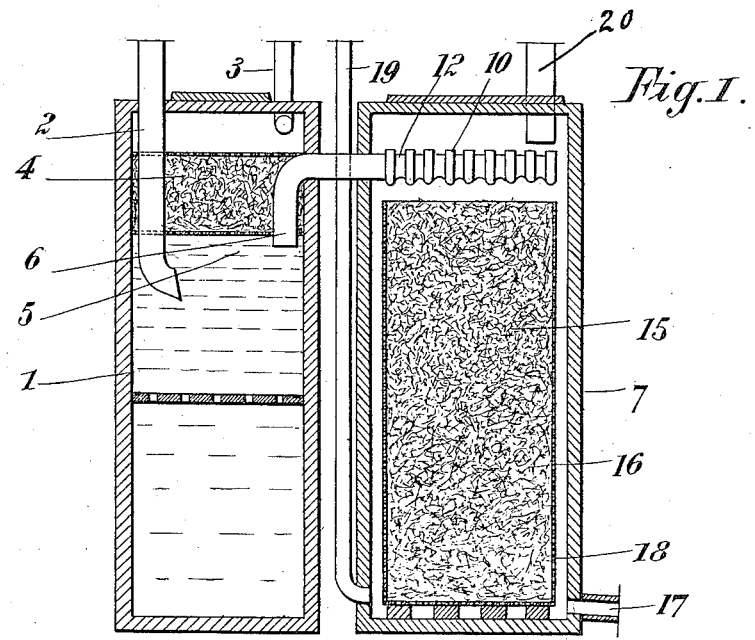
Figure 2:
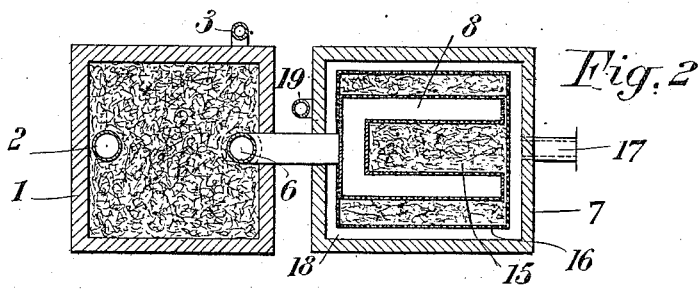
Figure 3:
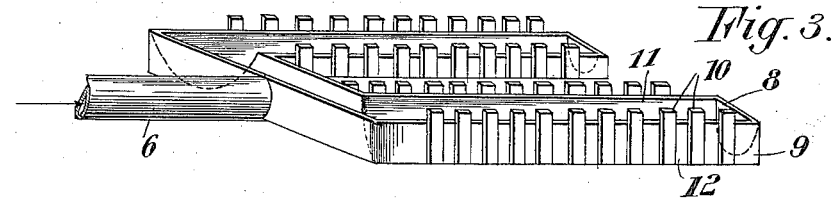
Figure 4:
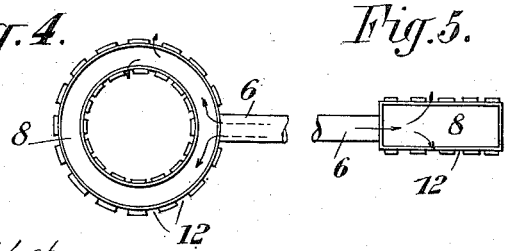
Figure 5:
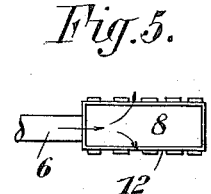
Figure 6:
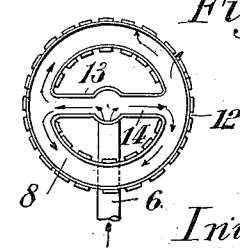

The accompanying drawing given by way of example, shows one form of embodiment of the invention, and in this drawing: Figure 1 shows a vertical section of the purifying apparatus. Fig. 2 is a horizontal sectional view of the same. Fig. 3 shows a perspective view of a U shaped overflow device. Figs. 4 and 5 show top plan views of two modified forms of the overflow device while Fig. 6 is a top plan view of a third modification of the same.

The apparatus comprises a solubilizing tank 1 the liquid and materials of which are as much as possible kept from contact with the surrounding air, the solubilization being effected by the action of the anaerobic microbes which originate either from the matters introduced through the vertical pipe 2 or from cultures made in the laboratory and introduced by portions into the tank. The gases resulting from the microbic actions escape through a small pipe 3 which discharges them either into the atmosphere or into a ventilating pipe. The tank 1 must be filled with water at the beginning of the operation.

The night soil materials arriving through the vertical pipe 2 divide themselves into two parts: some which are heavy fall to the bottom of the tank 1, others which are light rise up to the surface.

The materials sojourning in the deeper parts are violently attacked by the anaerobic microbes, but toward the surface the number of these anaerobes decreases to a large extent and consequently their work is less energetic. In order to increase their pullulation and their activity, a basket 4 made of wire gauze with large meshes or a foraminated plate, intended to receive dross of iron, various slags or other insoluble materials thus forming an anaerobic bacterial bed, is arranged at the top part of the tank so as to be dipped into the liquid contained in the latter. One thus obtains in the region where the delivery pipe opens out, *i. e.* at 5 a considerable accumulating of anaerobic microbes and a more perfect dissolution of the light materials. The tank 1 may be provided with a foraminated partition wall positioned between the lower part of the tank 1 and the anaerobic bed. The liquids charged with soluble materials pass then through the pipe 6 through which they are forced by a fresh amount of material introduced. The pipe 6 opens out at one end under the basket 4 and at its other end in the second tank 7 which is the oxidizing tank and more especially in the distributing or over-flow device which will be described hereafter. For this second part of the microbic work any part liable to be filled up or clogged has been avoided. The ordinary pipes foraminated or not, are replaced by a special distributer or over-flow device for the liquid, this device being formed by a trough or channel with which other secondary troughs having a smaller section are connected so as to be at right angles therewith, these smaller troughs being formed by providing ribs on the trough 12, or in any other suitable manner providing channels into which the liquids rapidly flow from the main troughs so as to fall therefrom in numerous thin jets on the oxidizing bed of bacteria. The main troughs may have any suitable form. In the form of embodiment as shown by Figs. 1, 2 and 3 this main trough 8 has the shape of a U with rectangular branches. On the vertical lateral walls 9 of these branches are secured or formed by vertical members 10 which slightly project above the upper edge of the main trough so as to provide between them a large number of small overflows 11 through which the liquids arrive in the small vertical channels 12 formed between the members 10 for finally falling on the oxidizing bed of microbes of the tank 7. The main trough 8 may also be circularly shaped as shown by Fig. 4, the liquids arriving from the septic tank from one side of the trough or from the center of the latter (Fig. 6). In the latter case, the delivery pipe 6 is divided into two secondary branches 13 and 14 which convey the liquids into the over-flow ring. The main over-flow is provided with numerous secondary troughs 12.

In the modified form shown by Fig. 5, the main trough 8 of the over-flow is rectangularly shaped and has only a single branch. In any case the over-flow is open at the top and is provided with vertical over-flow channels adapted to convey the liquids on the bacterial bed. The liquids, which thus are poured out in numerous jets, cover entirely the surface of the beds of bacteria, and are thus better subjected than by the usual processes to the oxidizing contact of the nitrifying bacteria and of the oxygen of the air which fills the apparatus. The materials 15 of the oxidizing bed of bacteria are inclosed in casing 16 made of any suitable material (basket of iron wire, apertured brick work and so on).

The purified liquids escape from the tank 7 through a pipe 17 provided at the bottom of the bed.

A large passage 18 surrounds the bed of bacteria and through this passage flows a constant air current which is maintained by aerating tubes 19 and 20.

The beds for the bacteria are formed of scoriæ, iron slag, peat and so arranged as to maintain the rational passage of the liquid and of the air and to facilitate the pullulation of the nitrifying bacteria.

Having now fully described my said invention, what I claim and desire to secure by Letters Patent is:

In a device for the purification of waste matter, a solubilizing tank and a purifying tank, a perforated receptacle in said purifying tank, a distributer supported within said purifying tank, said distributer comprising a substantially fork-shaped trough member, a plurality of ribs secured to the outer wall of the trough member, one end of each rib extending above the top of the trough, and the opposite end of each of the ribs extending to the bottom of the trough, and the spaces between the ribs forming channels to allow the waste matter to flow into the purifying tank.

In testimony wherof I have hereunto set my hand in presence of two witnesses.

ALEXANDRE GIRARD.

Witnesses:
H. C. COXE,
JOHN BAKER.

---

Copies of this patent may be obtained for five cents each, by addressing the "Commissioner of Patents, Washington, D. C."